(12) United States Patent
Kumar et al.

(10) Patent No.: US 8,145,732 B2
(45) Date of Patent: Mar. 27, 2012

(54) LIVE NETWORK CONFIGURATION WITHIN A LINK BASED COMPUTING SYSTEM

(75) Inventors: Mohan J. Kumar, Aloha, OR (US); Murugasamy Nachimuthu, Hillsboro, OR (US); Allen Baum, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 908 days.

(21) Appl. No.: 11/284,537

(22) Filed: Nov. 21, 2005

(65) Prior Publication Data

US 2007/0118628 A1    May 24, 2007

(51) Int. Cl.
    G06F 15/177    (2006.01)
    G06F 15/173    (2006.01)
    G06F 15/16     (2006.01)
    G06F 11/00     (2006.01)
    G06F 9/44      (2006.01)
    G06F 9/445     (2006.01)
    H04L 12/28     (2006.01)
    H04B 1/38      (2006.01)
    G06Q 10/00     (2006.01)
    G06Q 30/00     (2006.01)

(52) U.S. Cl. ........ 709/220; 709/223; 709/232; 709/235; 709/250; 370/230; 370/235; 370/252; 370/254; 370/256; 705/1; 705/26; 717/108; 717/171; 717/174

(58) Field of Classification Search .................. None
     See application file for complete search history.

(56) References Cited

U.S. PATENT DOCUMENTS

| 5,630,184 | A   | * | 5/1997  | Roper et al. ................. 709/221 |
| 6,009,488 | A   |   | 12/1999 | Kavipurapu |
| 6,377,987 | B1  | * | 4/2002  | Kracht ......................... 709/220 |
| 6,560,756 | B1  |   | 5/2003  | Necoechea et al. |
| 6,625,124 | B1  | * | 9/2003  | Fan et al. ..................... 370/235 |
| 7,376,719 | B1  | * | 5/2008  | Shafer et al. ................. 709/220 |
| 2002/0085508 | A1 | * | 7/2002 | Suonsivu et al. ............. 370/256 |
| 2003/0105844 | A1 | * | 6/2003 | Hada et al. ................... 709/220 |
| 2005/0125516 | A1 | * | 6/2005 | Molnar ......................... 709/223 |
| 2007/0133569 | A1 | * | 6/2007 | Lee et al. ..................... 370/398 |
| 2007/0169080 | A1 | * | 7/2007 | Friedman ..................... 717/168 |

* cited by examiner

*Primary Examiner* — Ario Etienne
*Assistant Examiner* — Ho Shiu
(74) *Attorney, Agent, or Firm* — Blakely, Sokoloff, Taylor & Zafman LLP

(57) ABSTRACT

A method is described in which, in response to notice of a configuration event yet to happen within a network that is part of a link-based computing system, a component within said link based computing system: a) identifies networking configuration information changes to be made by components within the link-based computing system; and, b) sends instances of program code to each one of the components. Each instance of program code is to be executed by a specific component that it was sent to. Each instance of program code is customized to implement the particular one or more networking configuration information changes to be made at the specific component it was sent to.

20 Claims, 5 Drawing Sheets

US 8,145,732 B2

LIVE NETWORK CONFIGURATION WITHIN A LINK BASED COMPUTING SYSTEM

FIELD OF INVENTION

The field of invention relates generally to the monitoring of computing systems, and, more specifically, to live network configuration within a link based computing system.

BACKGROUND

FIG. 1a shows a depiction of a bus 120. A bus 120 is a "shared medium" communication structure that is used to transport communications between electronic components 101a-10Na and 110a. Shared medium means that the components 101a-10Na and 110a that communicate with one another physically share and are connected to the same electronic wiring 120. Thus, for example, if component 101a wished to communicate to component 10Na, component 101a would send information along wiring 120 to component 10Na; if component 103a wished to communicate to component 110a, component 103a would send information along the same wiring 120 to component 110a, etc.

Computing systems have traditionally made use of busses. With respect to certain IBM compatible PCs, bus 120 may correspond to a PCI bus where components 101a-10Na correspond to "I/O" components (e.g., LAN networking adapter cards, MODEMs, hard disk storage devices, etc.) and component 110a corresponds to an I/O Control Hub (ICH). As another example, with respect to certain multiprocessor computing systems, bus 120 may correspond to a "front side" bus where components 101a-10Na correspond to microprocessors and component 110a corresponds to a memory controller.

In the past, when computing system clock speeds were relatively slow, the capacitive loading on the computing system's busses was not a serious issue because the degraded maximum speed of the bus wiring (owing to capacitive loading) still far exceeded the computing system's internal clock speeds. The same cannot be said for at least some of today's computing systems. With the continual increase in computing system clock speeds over the years, the speed of today's computing systems are reaching (and/or perhaps exceeding) the maximum speed of wires that are heavily loaded with capacitance such as bus wiring 120.

Therefore computing systems are migrating to a "link-based" component-to-component interconnection scheme. FIG. 1b shows a comparative example vis-á-vis FIG. 1a. According to the approach of FIG. 1b, computing system components 101a-10Na (e.g., I/O components, processors) and 110a (e.g., ICH, memory controller) are interconnected through a mesh 140 of high speed bi-directional point-to-point links $130_1$ through $130_N$. A bi-directional point-to-point link typically comprises a first unidirectional point-to-point link that transmits information in a first direction and a second unidirectional point-to-point link that transmits information is a second direction that is opposite that of the first direction.

Each point-to-point link can be constructed with copper or fiber optic cabling and appropriate drivers and receivers (e.g., single or differential line drivers and receivers for copper based cables; and LASER or LED E/O transmitters and O/E receivers for fiber optic cables; etc.). The mesh 140 observed in FIG. 1b is simplistic in that each component is connected by a point-to-point link to every other component. In more complicated schemes, the mesh 140 is a network having routing nodes. Here, every component need not be coupled by a point-to-point link to every other component.

Instead, hops across a plurality of links may take place through routing/switching nodes in order to transport information from a source component to a destination component. Depending on implementation, the routing/switching function may be a stand alone function within the network or may be integrated into a substantive component of the computing system (e.g., processor, memory controller, I/O control hub, etc.). According to one perspective, the term "link agent" is used to refer to a component of a link based computing system that includes any such substantive component.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A challenge for link based computing systems is the ability to change the configuration of the computing system's network without corrupting one or more of the computing system's working processes. For instance, consider the "hot-plugged" removal of a component from a link based computing system (e.g., a processor is removed between times at which the computing system is "working"). The sudden removal of this component without certain procedures applied beforehand to the network's various routing tables or other network configuration information in anticipation of the removal could result in another component mistakenly attempting to send a packet of information to the missing/removed component. Such a mistake could result in the packet never reaching its intended destination, which, in turn, could result in the corruption and/or failure of one or more of the computing system's working processes.

Figure 1A:
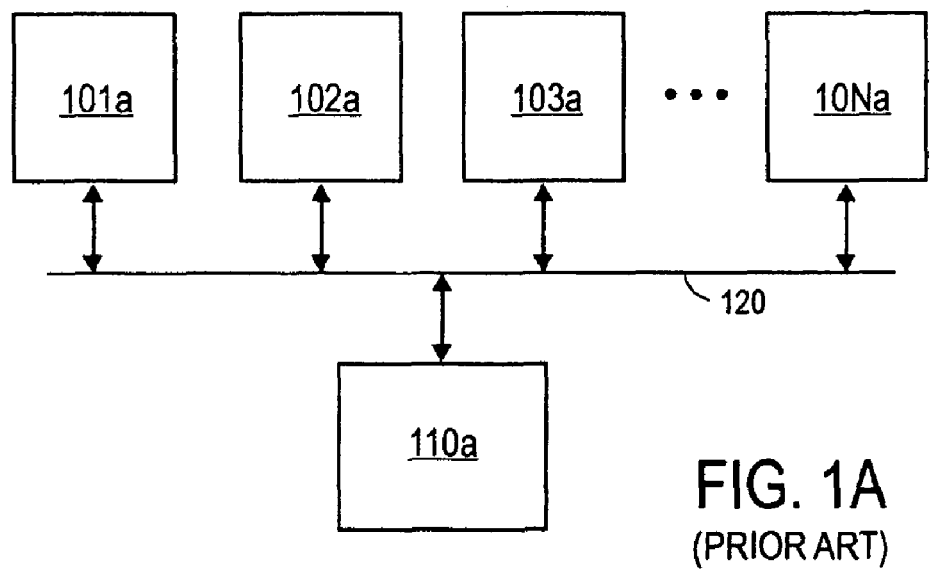
FIG. 1a (prior art) shows a bus based computing system.
Figure 1B:
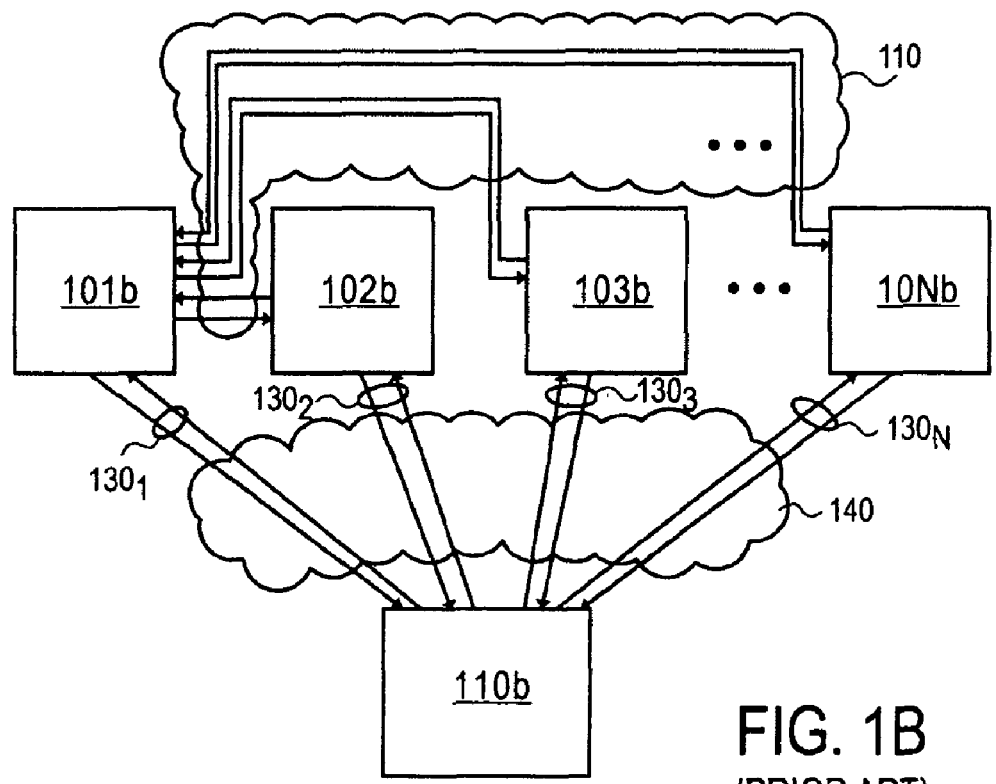
FIG. 1b (prior art) shows a link based computing system.
Figure 2:
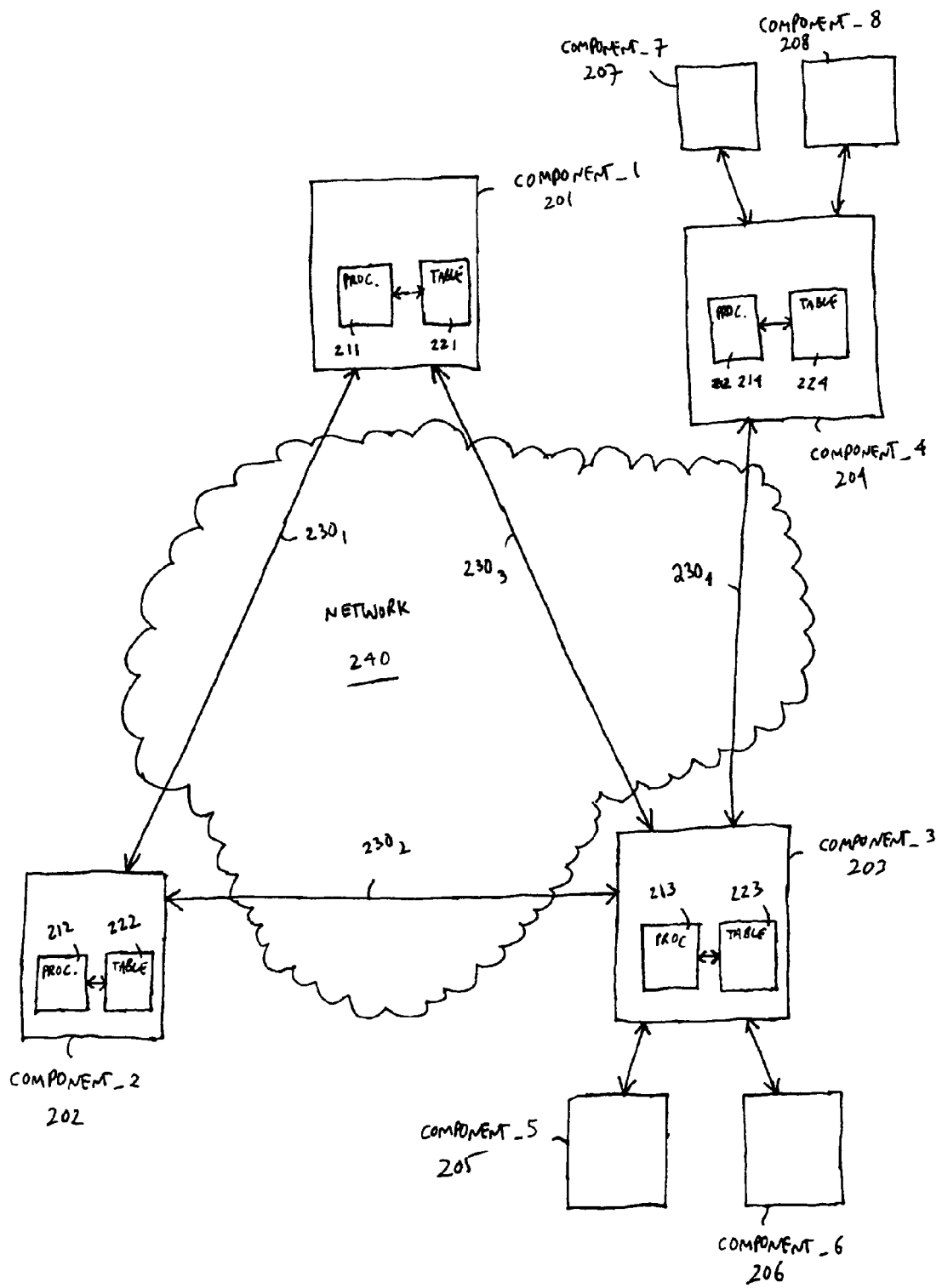
FIG. 2 shows an exemplary link based computing system having a plurality of components communicatively coupled though a network.

FIG. 2 shows a computing system having a plurality of components 201 through 208. An aspect of the computing system of FIG. 2 is that some components within the system are an "independent" type of component that is responsible for effecting a change to its own internal networking configuration information in response to a networking configuration change event (e.g., a hot-plug event (removal or insertion), an on-lining or off-lining event (e.g., where a node is added or removed from the perspective of the Operating System but not physically added or removed, a memory re-slivering (e.g., in which mirrored memory mode is re-established after a previous failure), whereas, other components within the computing system are a "dependent" type of component that depends on another component to effect a change to its own internal network configuration information in response to a networking configuration change event.

Here, a change to a component's internal networking configuration information may involve making a change to information that is accessible and useable to the component's own circuitry. The information may be kept, for instance, in any of a number of different structures used to maintain information (e.g., one or more registers, memory, etc.), where, these structures are designed into or their storage cells are at least made accessible to the component's own circuitry.

According to the depiction of FIG. 2, components 201 through 204 are of the "independent" type described above (i.e., each of components 201 through 204 effects its own internal information change in response to a networking configuration change event) and components 205 through 208 are of the "dependent" type described above (i.e., each of components 205 through 208 depend on another component to effect a change to its own internal information change in response to a networking configuration change event). Here, a component may be deemed to be "dependent" if it is configured to have another component within the computing system change its networking configuration information in response to an event (even if the component's circuitry and/or software could make such a change if it were configured differently).

According to the computing system of FIG. 2, the computing system's independent components are responsible for effecting internal networking configuration information changes to the computing system's dependent components. Referring to the example of FIG. 2, dependent components 205, 206 are dependent on "independent" component 202, and, dependent components 207, 208 are dependent on independent component 204. Thus, if a networking configuration change event were to occur, component 202 would change not only its own internal networking configuration information but also the internal networking configuration information of components 205 and component 206. Likewise, component 204 would change its own internal networking configuration information and the internal networking configuration information of components 207 and component 208. It is against this backdrop that the presently described methodologies are better understood.

Note that the depiction of FIG. 2 is exemplary for the purposes of bringing forth pertinent aspects of the present teachings. In actual implementation, dependent components are often coupled to two independent components for redundancy and/or bandwidth reasons (e.g., component 207 would be coupled to both components 201 and 204). Also, dependent components tend to be I/O controller/hubs while independent components tend to include processing cores and/or memory controllers.

As just one implementation, independent components may have special supporting software (and/or processor(s)) to support the execution of program code that, when executed, effects the necessary configuration information change(s); and, dependent components do not include such supporting software (and/or processor(s)). Components 201 through 204 are therefore each depicted as including respective "processing elements" 211 through 214 whose responsibilities at least include implementing networking configuration information changes in response to networking configuration events, and, components 205 through 208 are each depicted as not including such processing elements. Dependent components 205 through 208 therefore depend on the processing element of their respective independent component (processing element 213 for components 205 and 206, and, processing element 214 for components 207 and 208) to support the execution of program code that effectively implements their respective internal networking configuration information change(s).

Figure 3:
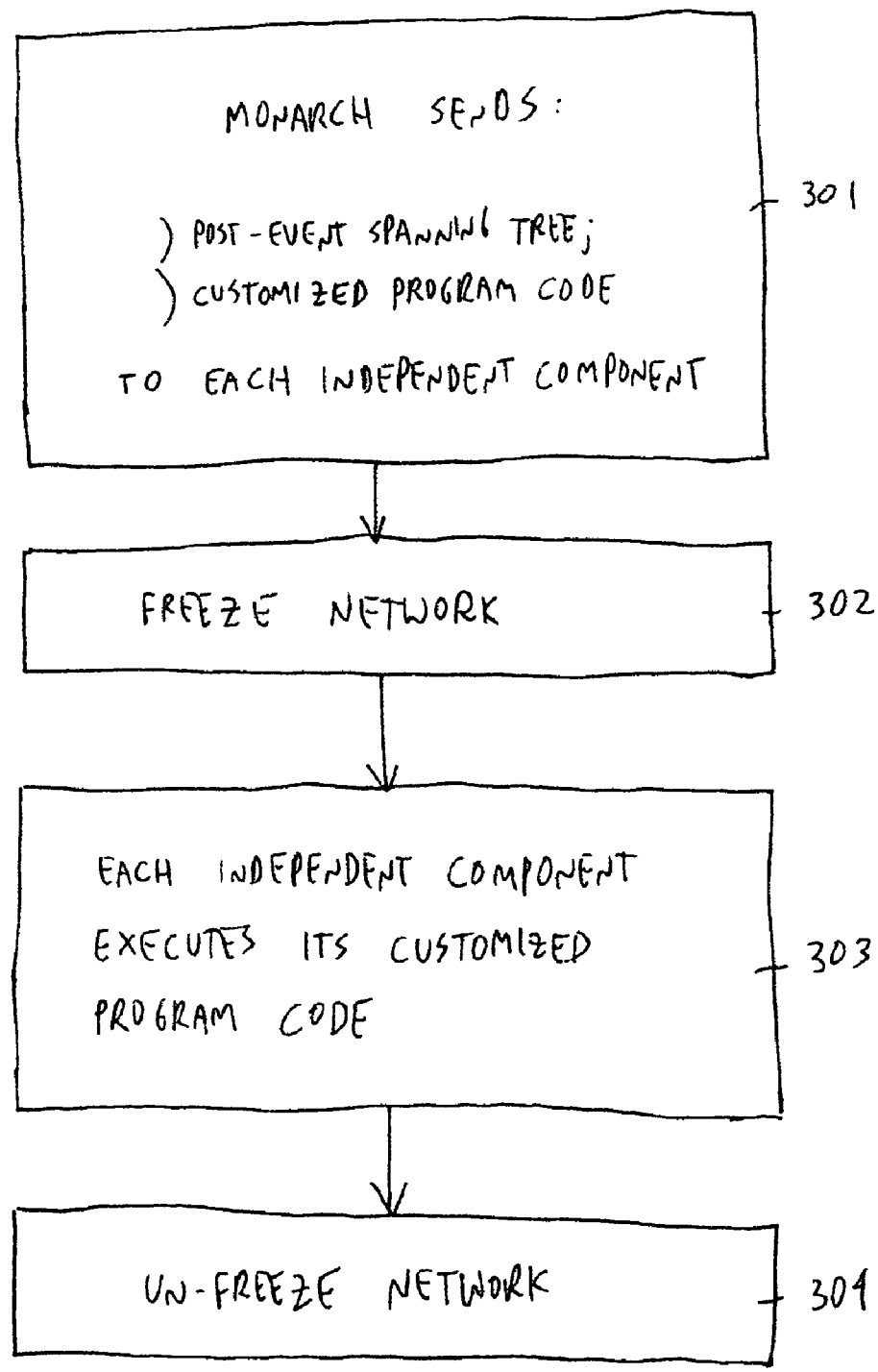
FIG. 3 shows a methodology for updating a plurality of routing configuration tables within a link based computing system.

FIG. 3 shows a methodology for successfully implementing networking configuration information changes internally to all components 201 through 208 in response to a networking configuration change event. For simplicity, as an example that demonstrates the methodology of FIG. 3, it is assumed that the networking configuration change event corresponds to the hot-plugged removal of component 202. For convenience, each of independent components 201 through 204 include a respective routing table 221 through 224 used to forward packets within the computing system's network 240 to an appropriate "next-hop" component within the network (routing tables are discussed in more detail below toward the end of this detailed description), and none of dependent components 205 through 208 include a routing table. Not that, even though the example of FIG. 2 does not reflect it, at least some computing systems may be designed such that independent components do not need to have a routing table.

The internal networking configuration information changes to be made in light of the removal of component 202 are assumed to include for the sake of example: 1) for component 201, one or more updates to routing table 221 that results in no packets being forwarded over link 230_1, and, another update (e.g., to some other register or memory space internal to component 201) that prevents component 201 from generating packets whose destination component is component 202; 2) for component 203, one or more updates to routing table 223 that removes component 202 as a recognizable destination and results in no packets being forwarded over link 230_2, and, another update (e.g., to some other register or memory space internal to component 203) that prevents component 203 from generating packets whose destination component is component 202; 3) for component 204, an update to routing table 224 that removes component 202 as a recognizable destination, and, another update (e.g., to some other register or memory space internal to component 204) that prevents component 204 from generating packets whose destination component is component 202; and, 4) for each of components 205 through 208, an update (e.g., to register or memory space internal to these components) that prevents these component from generating packets whose destination component is component 202.

Figure 4:
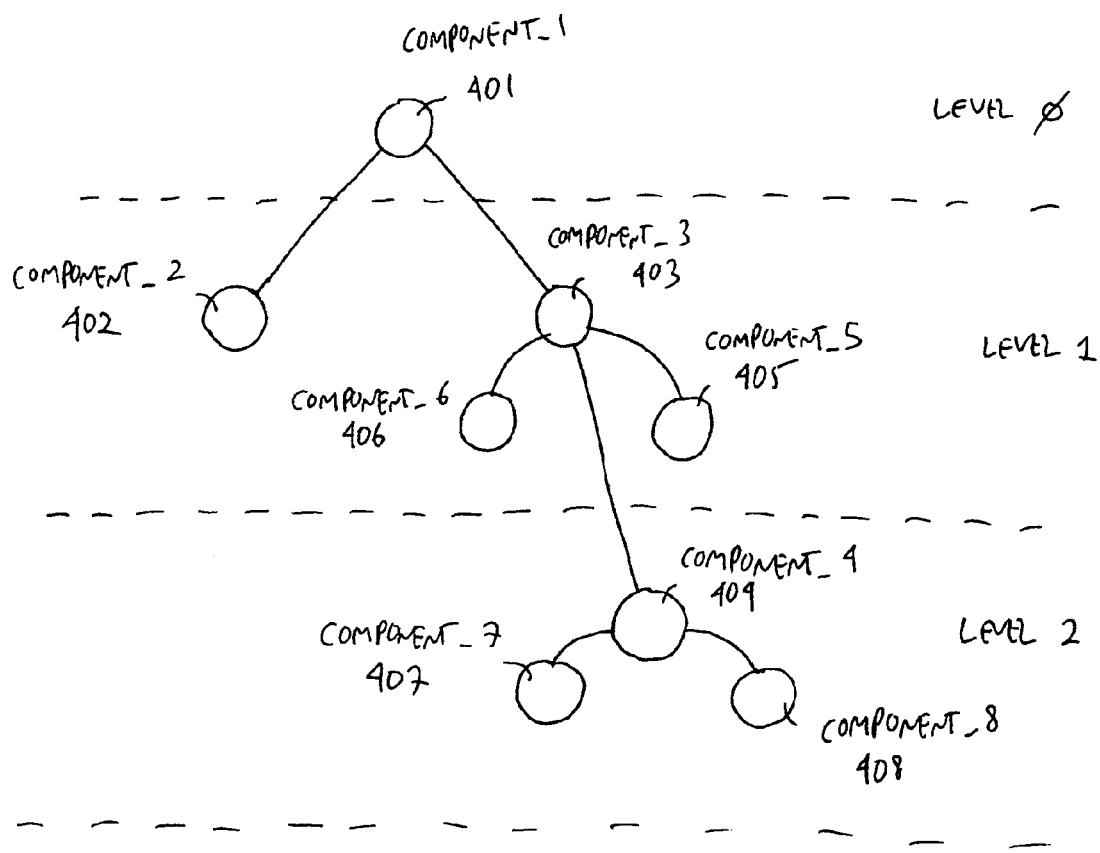
FIG. 4 shows a network topology spanning tree prior to a network topology change.
Figure 5:
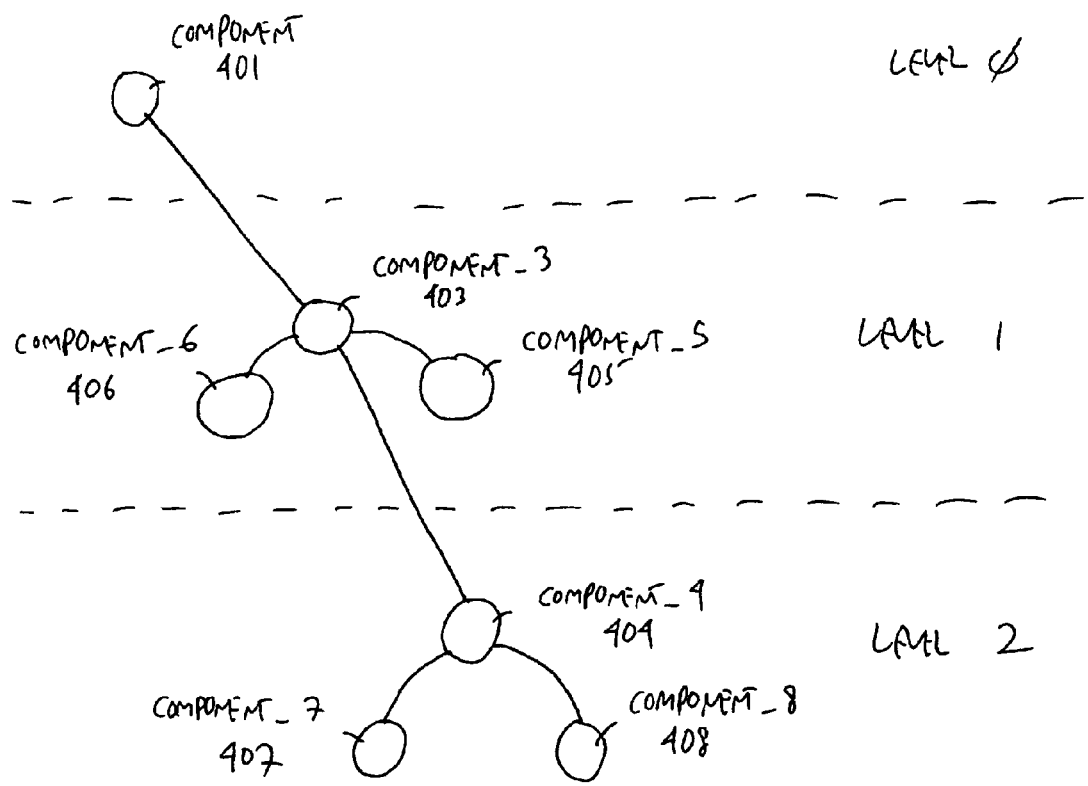
FIG. 5 shows a network topology spanning tree after a network topology change.

According to one approach that is consistent with the methodology of FIG. 3, a spanning tree is used to: 1) report the specific networking configuration change event to the various independent components; and, 2) define a hierarchy in the network that effectively depicts the manner in which successful change(s) to the internal networking configuration information of the various components within the computing system will be reported. FIGS. 4 and 5 respectively depict spanning trees for the present example before the event and after the event, respectively. That is, FIG. 4 shows a spanning tree that represents the computing system prior to the event (i.e., prior to the removal of component 202). FIG. 5 shows a spanning tree that represents the computing system after the event.

Both of the spanning trees of FIGS. 4 and 5 reflect a hierarchy in which component 202, 402 is the "monarch" (i.e., at the highest level in the hierarchy), and, each independent component 202/402 through 204/404 resides at a level in the hierarchy that is a function of how far away (in terms of nodal hops within the network 240) the component is from the monarch. Specifically, referring to FIG. 4, components 202/402 and 203/403 are one level beneath the monarch 201/401 in the hierarchy because they are one nodal hop from the monarch 201/401 (over links 230_1 and 230_2, respectively). By contrast, component 204/404 is two levels beneath the monarch in the hierarchy because it is two hops from the monarch 201/401 (over links 230_3 and 230_4 using a "shortest path" definition of distance to the monarch 201/401). Dependent components are deemed to be at the same level as their respective independent component. Thus, components 205 and 206 are deemed to be at the same level as component 203 and components 207 and 208 are deemed to be at the same level as component 204.

The monarch 201/401 is essentially the primary intelligence for implementing networking configuration changes for the computing system's network 240. Here, according to the methodology of FIG. 3, the monarch sends 301 the following items to each of the computing system's independent components: 1) program code that when executed effects the necessary networking configuration information changes for both the independent component and its independent components (if any); and, 2) a post-event spanning tree representation of the network (e.g., as depicted in FIG. 5). For simplicity, the post-event spanning tree will hereinafter be referred to as "the spanning tree".

In an embodiment, the spanning tree is constructed such that the component targeted for removal is either a leaf node in the tree, or, an intermediate node in the tree, where, if the intermediate node has children nodes, the nodes must be dependent (this ensure that all the independent nodes in the (post-event) spanning tree are connected and able to communicate the results back to the root). Moreover, the spanning tree information consists of a description of the entire tree or just data describing neighboring links relative to a node that receives spanning tree information (e.g., the identity of the nodes neighboring to node 203 (and/or links connecting them) are sent as the spanning tree information that is sent specifically to node 203).

In an embodiment, the program code that is sent to an independent component is "customized" for the independent component in terms of: 1) the type of component that the independent component is; and/or, 2) the type of dependent components that the independent component effects networking configuration information changes for; and/or, 3) the nature of the networking configuration change to be made. Any one of these can necessitate the sending of customized program code.

For instance, if component 203 is "different" than component 204 (e.g., component 203 is a memory controller and component 204 is an I/O controller), the manner in which their internal networking configuration information is kept/accessed/changed is apt to be different as well (e.g., component 203, as compared to component 204, may employ different register/memory names and/or different register/memory target locations and/or different register/memory accessing procedures for implementing the networking configuration change(s)). As a consequence, the program code that is sent to component 203 to implement a change to its internal networking configuration information is apt to be different than the program code that is sent to component 204.

Moreover, for similar reasons, if the dependent components 205, 206 of independent component 203 are "different" than the dependent components 207, 208 of independent component 204 (e.g., components 205, 206 are hard disk file components and components 207, 208 are external network interface I/O components), the program code that is sent to component 203 for purposes of effecting the internal networking configuration information changes to components 205, 206 is apt to be different than the program code that is sent to component 204 for purposes of effecting the internal networking configuration information changes to components 207, 208.

Lastly, the nature of the change to be made may effect customized program code deployment from the monarch to a particular independent component. For instance, recall that the change to be effected at routing table 223 involves one or more updates to routing table 223 that: a) removes component 202 as a recognizable destination; and, b) results in no packets being forwarded over link 230_2. By contrast, the change to be effected at routing table 224 only involves removing component 202 as a recognizable destination. As such, the change to be effected at routing table 223 is different than the change to be effected at routing table 224, which, again, may result in different program code being sent to component 203 as compared to component 204 (note also that, in terms of the nature of the change, the program code that is sent to component 203 will at least be similar to the program code that is sent to component 204 in the sense that each of components 203 through 208 will be reconfigured so as to be unable to generate a packet destination address that corresponds to component 202).

Thus, to summarize, the customized program code that is sent to component 203 is apt to be: 1) specific to component 203's type; 2) specific to the type of dependent components that component 203 supports; 3) specific to the nature of the changes to be made at components 203, 205 and 206. Likewise, the customized program code that is sent to component 204 is apt to be specific to the particular characteristics and situation of components 204, 207 and 208 in light of the change to be made.

In order for customized program code to be sent 301 to each of the independent components 203, 204, the monarch 201 is designed to build the customized program code. In an embodiment, the monarch's own program code for responding to network events is implemented as part of the BIOS of the monarch 201 (e.g., the BIOS program code is implemented in firmware with a non volatile ROM within the monarch component 201). Moreover, in a further implementation, the program code used to implement networking configuration information changes, for any type of component that the link based computing system supports, is embedded in or otherwise made available to the monarch's program code for responding to network configuration change events.

By further designing this monarch code to comprehend the configuration of the computing system's network, comprehend changes to the network, and, comprehend the nature of the internal networking configuration information maintained by each different component within the computing system, the monarch's program code can respond to pre-event notification of a desired network configuration change (e.g., notice of the event is given to the monarch's BIOS by the Operating System (OS) before the event actually happens) by: 1) building or receiving a post-event spanning tree that reflects the change; 2) for each component within the computing system, determining the appropriate internal configuration information update (if any) to be made in light of the change; 3) fetching (or perhaps crafting) each specific block of program code needed to implement each update from 2) above; 4) organizing the program code from 3) above into customized "bundles" for each independent component; and, 5) sending each bundle to its appropriate component along with the spanning tree information (here, it is assumed the pre-event spanning tree is in existence before or is provided with notice of the desired event). Referring to FIG. 3, note that 4) above corresponds to procedure 301 of FIG. 3.

According to the methodology of FIG. 3, after the monarch has sent the spanning trees and customized bundles of program code to the independent components within the computing system, the computing system's network is effectively "frozen" 302. According to one approach, the freezing of the computing system's network corresponds to the suspension ("hibernation") of computing system processes that involve interaction between two or more components (as opposed to a purely "local" process running on a single component having no dependence on another component). In order to effect the freezing of the network, according to one approach, each component is placed into a "quiescent" state by the computing system's OS. The effect of the quiescent state is to prevent each component from entering any packet into the network—except for those packets that contribute to the network configuration update process.

Once each of the appropriate independent components receive their customized program code, their processing elements execute the program code 303 so as to update their own internal networking configuration information and effect the internal networking configuration of their dependent components too. Because of the heavy usage of the network within a link based computing system, it is expected that many of the computing system's working processes will be suspended once the network is frozen. As such, implementing the networking configuration information changes "as soon as possible" is a pertinent perspective.

Here, significant time savings may be enjoyed according to the present approach if the different bundles of program code are executed substantially in parallel (e.g., significant portions of customized program code are executed simultaneously by two or more components). That is, essentially, distributing the task of updating networking configuration information to the independent components themselves permits a kind of large-scale parallel operation that should take less time than controlling the actual updates themselves in a serialized fashion from a centralized location. In an embodiment, the monarch first confirms that the customized program code was successfully delivered to all independent components (e.g., by waiting for confirmation from each independent component). Then, upon such confirmation, issues a "start" command to each of the independent components.

Here, it is also pertinent to note that updating each component's internal configuration information as discussed above while the network is "frozen" may be difficult to effect without the formation and sending of the customized bundles of program code by the monarch. Specifically, recalling that the freezing of the network is expected to result in the freezing of a large number of processes within the computing system, the entering of the quiescent state at each of the independent components may cause significant portions of the memory from which code at an independent node is executed to be frozen/locked too. That is, an internal process is frozen by simply keeping the software state in memory until the process is permitted to continue after the network is unfrozen.

The customized bundles of program code, being "small" in size because they have been specially crafted for the particular situation that presently exists at the independent component (in terms of independent component type, dependent component type(s) and nature of the change), can be more easily fit into a small region of memory that is deemed "usable" (where, large portions of memory have been locked because of the independent component's entry into the quiescent state) as compared to a much larger, sophisticated program that is designed to handle "any" networking configuration change event. More simply stated, if small customized blocks of program code where not delivered to the independent components as described above, and each independent component was instead designed with comprehensive code to handle any event, the size of the code needed to be executed during the quiescent state may be too large for the memory resources available when the network is frozen. In a further implementation, the customized program code is loaded into the cache of the independent component's processor(s) so as to not be concerned with their more remote memory.

According to an implementation, each independent node confirms the successful implementation of itself and its dependent components. The spanning tree is then used to comprehend when to "bubble-up" confirmation of success. That is, referring to FIG. 5, confirmation of successful update starts at the furthest levels from the monarch from each branch in the spanning tree and works it way up to the monarch. For instance, in the case of the spanning tree of FIG. 5, the spanning tree information would be used: 1) by independent component 204 to understand that it is to report successful update of all its changes to component 203 as soon as such confirmation exists; 2) by independent component 203 to understand that it is to report successful update of all its changes to the monarch once it receives confirmation of success from independent component 204. Again, as mentioned previously, spanning tree information could be customized for a recipient (e.g., only the post event neighbors of node 203 would be sent to node 203). Once the monarch receives confirmation from all of its nearest neighbor independent components (in the case of the example being described herein, only component 203 meets this definition), the monarch signifies to the platform firmware (BIOS) that the network is ready to be unfrozen. The network is then unfrozen 304 and the internal processes of the computing system resume.

Packet networks employ routing tables to transfer packets from source to destination. Different types of routing tables exist. Generally, routing tables are used to correlate a "destination address", a "connection identifier" and/or other information found by a node within a received packet's header information to some kind of "flow information" that helps to effect proper transmission of the packet from the node (e.g., a particular outbound link from the node that is connected to the "next-node" along the packet's proper path through the network).

In operation, upon receipt of a packet, a node will use the pertinent information from within a packet's header to "look up" the flow information from the routing table. The node then uses the flow information to properly direct the packet to its proper emission point from the node (e.g., a particular outbound link). Some examples of flow information include one or more of: 1) the identification of a particular outbound link from the node; 2) the identification of a particular network interface that can transmit packets from the node; 3) the identification of a particular queue within the node that temporarily holds packets before they are further processed by the node or sent from the node; 4) an internal address within the node whose "downstream" logic is responsible for transmitting the packet from the node; 5) the identification of one of the node's outbound connections; 6) the identification of an internal switching or routing core within the node (and/or input port or queue thereto); 7) the identification of a internal "connection" within the node (e.g., that flows through an internal switching or routing core within the node); etc. For purposes of this application, the term "routing table" is intended to cover implementations that are consistent with the discussion above but are nevertheless referred to with another name by those of ordinary skill (e.g., "switching table", "source address decoder", etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Processes taught by the discussion above may be performed with program code such as machine-executable instructions and data which cause a machine (such as an "interpreter" (e.g., a Java virtual machine) that converts abstract instructions into processor specific instructions, a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The invention claimed is:

1. A method, comprising: in response to notification of a configuration event yet to happen within a network that is part of a link-based computing system, executing the following at a component within said link based computing system:
    a) identifying networking configuration information changes to be made by components within said link-based computing system, said components being located at different destinations on said network;
    b) sending a spanning tree description that reflects the respective change of instances of executable program code which describes at least a portion of said network after said event;
    c) sending of said instances of executable program code to each one of said components and waiting for confirmation of successful reception of each of said instances of executable program code at its respective one of said components, each of said instances of executable program code to be executed by its respective component, and, being customized to implement at least one of said networking configuration information changes from said respective component;
    d) after confirming that each one of said instances of executable program code has been successfully received at its respective one of said components sending a start command to each one of said components to begin executing its respective one of said instances of program code so that each one of said components can implement its one or more respective networking configuration information changes in view of its respective description of the network after the event.

2. The method of claim 1 wherein at least one of said components includes an I/O controller.

3. The method of claim 1 wherein at least one of said components includes a memory controller.

4. The method of claim 1 wherein at least one of said components includes a processor.

5. The method of claim 1 wherein at least one of said components has multiple sub-components, one or more of said sub-components selected from the group consisting of:
    a) a processor;
    b) a memory;
    c) an I/O controller.

6. The method of claim 1 wherein said method further comprises causing said network to be in a state where packets that are not used to help ensure that said configuration changes are successfully made are prevented from entering said network before said configuration changes are made.

7. The method of claim 1 wherein at least one of said instances of executable program code includes executable program code that, when executed by its respective component, causes networking configuration information to be changed at a component other than said respective component.

8. An article of manufacture storing program code which, when executed by a machine within a component within a link based computing system, causes the machine to perform a method, the method comprising:
    in response to notification of a configuration event yet to happen within a network that is part of said link-based computing system:
    a) identifying networking configuration information changes to be made by components within said link-based computing system, said components being located at different destinations on said network;
    b) sending a spanning tree description that reflects the respective change of instances of executable program code which describes at least a portion of said network after said event;
    c) sending of said instances of executable program code to each one of said components and waiting for confirmation of successful reception of each of said instances of executable program code at its respective one of said components, each of said instances of executable program code to be executed by its respective component and, being customized to implement at least one of said networking configuration information changes from said respective component;
    d) after confirming that each one of said instances of executable program code has been successfully received at its respective one of said components sending a start command to each one of said components to begin executing its respective one of said instances of program code so that each one of said components can implement its one or more respective networking configuration information changes in view of its respective description of the network after the event.

9. The article of manufacture of claim 8 wherein at least one of said components is an I/O controller.

10. The article of manufacture of claim 8 wherein at least one of said components is a memory controller.

11. The method of claim 8 wherein at least one of said components includes a processor.

12. The method of claim 8 wherein at least one of said components has multiple sub-components, one or more of said sub-components selected from the group consisting of:
    a) a processor;
    b) a memory;
    c) an I/O controller.

13. The article of manufacture of claim 8 wherein said method further comprises causing said network to be in a state where packets that are not used to help ensure that said configuration changes are successfully made are prevented from entering said network before said configuration changes are made.

14. The article of manufacture of claim 13 wherein said method further comprises, after confirming that said network configuration information changes were successfully made, causing said network to permit said packets to enter said network.

15. The article of manufacture of claim 8 wherein said confirming comprises receiving at said component that executes said method, from each component that is closest, on said spanning tree, to said component that executes said method:

notification that one or more networking configuration information changes were made.

16. The article of manufacture of claim 8 wherein at least one of said instances of executable program code includes executable program code that, when executed by its respective component, causes networking configuration information to be changed at a component other than a respective component.

17. A link based computing system, comprising:
- a first component having a processor and a second component having a memory controller, said first and second components coupled to each through a network having at least one router, said first component also comprising instructions disposed on a non-transitory computer readable medium, said instructions capable of being executed by said processor to perform a method, said method comprising:
- in response to notification of a configuration event yet to happen within a network that is part of said link-based computing system:
  - a) identifying networking configuration information changes to be made by components within said link-based computing system, said components being located at different destinations on said network;
  - b) sending a spanning tree description that reflects the respective change of instances of executable program code which describes at least a portion of said network after said event;
  - c) sending of said instances of executable program code to each one of said components and waiting for confirmation of successful reception each of said instances of executable program code at its respective one of said components, each of said instances of executable program code to be executed by its respective component, and, being customized to implement at least one of said networking configuration information changes from said respective component;
  - d) after confirming that each one of said instances of executable program code has been successfully received at its respective one of said components sending a start command to each one of said components to begin executing it's respective one of said instances of program code so that each one of said components can implement its one or more respective networking configuration information changes in view of its respective description of the network after the event.

18. The link based computing system of claim 17 wherein said method further comprises causing said network to be in a state where packets that are not used to help ensure that said configuration changes are successfully made are prevented from entering said network before said configuration changes are made.

19. The link based computing system of claim 18 wherein said method further comprises, after confirming that said network configuration information changes were successfully made, causing said network to permit said packets to enter said network.

20. The link based computing system of claim 17 wherein said confirming comprises receiving at said component that executes said method, from each component that is closest, on said spanning tree, to said component that executes said method:

notification that one or more networking configuration information changes were made.

* * * * *

UNITED STATES PATENT AND TRADEMARK OFFICE
CERTIFICATE OF CORRECTION

PATENT NO.        : 8,145,732 B2
APPLICATION NO.   : 11/284537
DATED             : March 27, 2012
INVENTOR(S)       : Kumar et al.

It is certified that error appears in the above-identified patent and that said Letters Patent is hereby corrected as shown below:

In the Claims

In column 12, at line 12 delete, "executing it's respective"; and insert -- executing its respective --.

Signed and Sealed this
Eighteenth Day of November, 2014

Michelle K. Lee
*Deputy Director of the United States Patent and Trademark Office*